(12) United States Patent
Hollander et al.

(10) Patent No.: US 8,153,975 B2
(45) Date of Patent: Apr. 10, 2012

(54) INTERFACING DEVICES AND SYSTEMS

(75) Inventors: Milton Bernard Hollander, Stamford, CT (US); Shahin Baghai, Trumbull, CT (US)

(73) Assignee: White Box, Inc., Stamford, CT (US)

( * ) Notice: Subject to any disclaimer, the term of this patent is extended or adjusted under 35 U.S.C. 154(b) by 355 days.

(21) Appl. No.: 12/455,178

(22) Filed: May 29, 2009

(65) Prior Publication Data

US 2009/0238238 A1    Sep. 24, 2009

Related U.S. Application Data

(63) Continuation-in-part of application No. 11/000,868, filed on Dec. 1, 2004, now Pat. No. 7,611,278, and a continuation-in-part of application No. 11/259,830, filed on Oct. 27, 2005, now Pat. No. 7,537,381, and a continuation-in-part of application No. 11/513,954, filed on Aug. 31, 2006, now Pat. No. 7,550,725, and a continuation-in-part of application No. 12/387,629, filed on May 5, 2009, and a continuation-in-part of application No. 12/387,630, filed on May 5, 2009, now Pat. No. 8,110,803.

(51) Int. Cl.
*G01J 5/00* (2006.01)
(52) U.S. Cl. .................................................. 250/338.1
(58) Field of Classification Search ............... 250/338.1, 250/330; 374/120, 121, 130
See application file for complete search history.

(56) References Cited

U.S. PATENT DOCUMENTS 5,368,392 A * 11/1994 Hollander et al. ............ 374/121
2005/0029459 A1 * 2/2005 Gotz et al. .................... 250/353
* cited by examiner

*Primary Examiner* — Mark R Gaworecki
(74) *Attorney, Agent, or Firm* — William A. Drucker

(57) ABSTRACT

A system combining the output of a thermal detection and imaging device with a capture and display device, such as a cordless or portable telephone/camera, is used to manage thermal information and displays.

2 Claims, 2 Drawing Sheets

FUNCTIONAL BLOCK DIAGRAM OF AN INFRARED THERMAL IMAGING CAMERA/ NIGHT VISION CAMERA/ VIDEO CAMERA WITH MULTIPLE LASER EMITTERS & SPEECH CAPABILITY TO AN iPHONE OR PDA

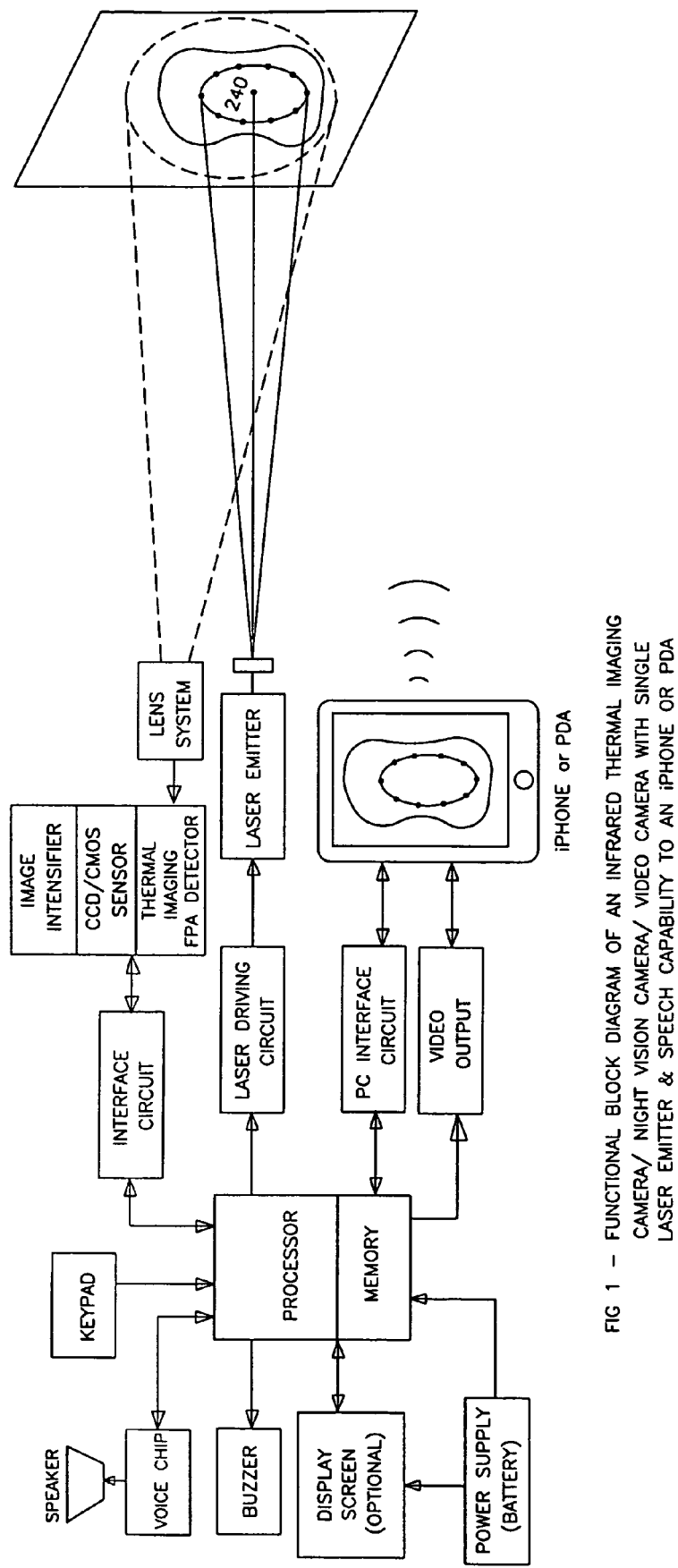
FIG 1 – FUNCTIONAL BLOCK DIAGRAM OF AN INFRARED THERMAL IMAGING CAMERA/ NIGHT VISION CAMERA/ VIDEO CAMERA WITH SINGLE LASER EMITTER & SPEECH CAPABILITY TO AN iPHONE OR PDA

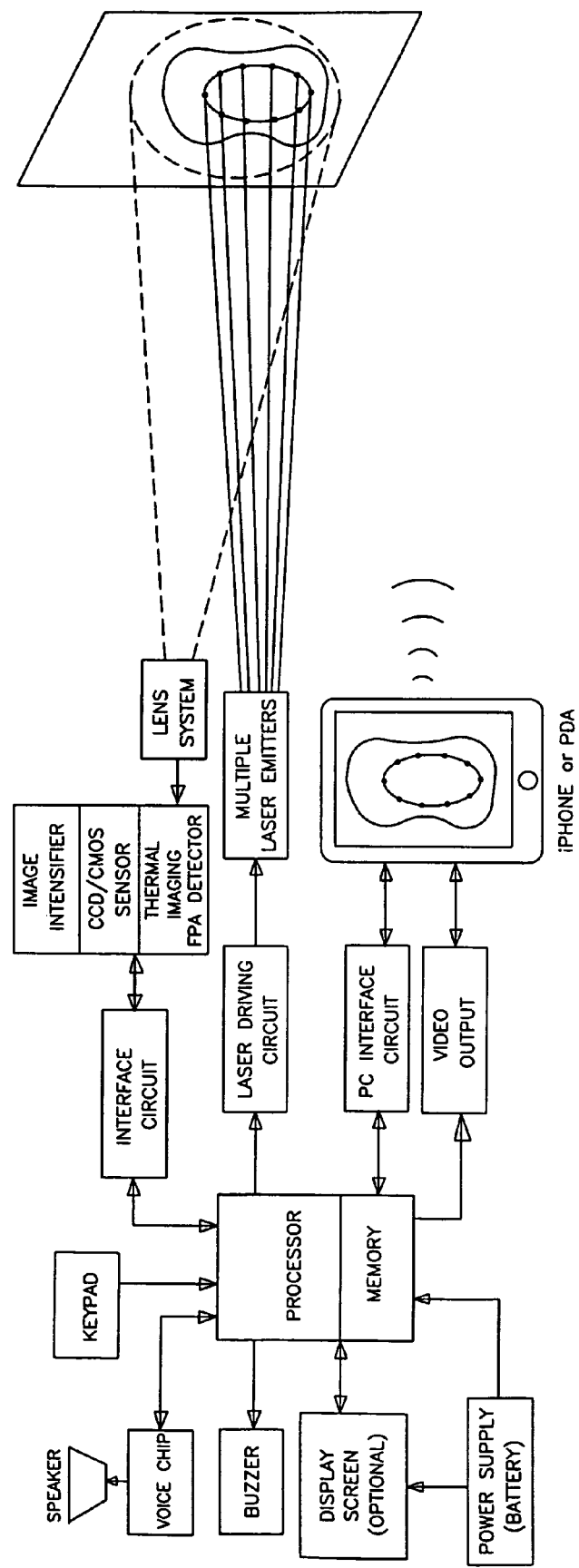
FIG 2 — FUNCTIONAL BLOCK DIAGRAM OF AN INFRARED THERMAL IMAGING CAMERA/ NIGHT VISION CAMERA/ VIDEO CAMERA WITH MULTIPLE LASER EMITTERS & SPEECH CAPABILITY TO AN iPHONE OR PDA

INTERFACING DEVICES AND SYSTEMS

This application is a continuation in part of the following copending applications of the same joint inventors; and the entire contents of each pending application are entirely incorporated herein by reference, including each U.S.A. provisional application upon which these applications are based:

Ser. No. 11/000,868 of Dec. 1, 2004 now U.S. Pat. No. 7,611,278 ; and Ser. No. 11/259,830 of Oct. 27, 2005 now U.S. Pat. No. 7,537,381; and Ser. No. 11/513,954 of Aug. 31, 2006 now U.S. Pat. No. 7,550,725; and Ser. No. 12/387,629 of May 5, 2009; and Ser. No. 12/387,630 of May 5, 2009 now U.S. Pat. No. 8,110,803.

This invention relates to a system of thermal detection and measurement devices combined with visual display products. Hand held and/or self-powered capture devices are of particular value in practice of this invention. An image of a thermal radiating surface is detected, measured and captured for independent display on a separate management product, such as an iPhone or cell phone or mobile phone or a PDA.

Thermal devices of particular use in this invention include a thermal imaging camera, a night vision or light amplifying camera, a photo cell photo-multiplier imaging device, a radiometer detector or infrared thermometer, a digital camera/video, or similar products which capture an image of a remote surface, with or without image storage or display capacity.

The image is conveyed directly or wirelessly (e.g. radio frequency, infrared) to be interfaced with the management device, such as an iPhone or PDA, for example, and the captured image is thereby displayed. The iPhone/PDA is either integral with the camera or is field mounted. This combination allows the operator to utilize recognized features of the iPhone/PDA to analyze and/or manipulate the image information from the detection or measurement component of the system and to transmit the information by wireless means to remote stations.

It is a feature of this invention that infrared radiation emanating from a remote surface area is visualized by protection of a lighting pattern of visible light, which comprises an aspect of the captured image. A detector responsive to radiation of these infrared wavelengths also captures infrared radiation, and visible reflected sighting pattern light is also separately detected and captured together with the infrared emanation.

In a best mode version of the invention the system includes an integral laser sighting system, which outlines the infrared field of view. The captured target image shows a laser light pattern superposed upon the infrared target. Visible light is derived from either a single source or separate sources according to brightness needed, for example according to target distance. Preferably at least three separate visible light marking sources are used and at most two light sources are switched on simultaneously. Brightness of sighting pattern is controlled according to distance and safety by switching control circuit and integral microprocessor means operated from optical chart data stored in the memory of on board processor means of the device, which also may automatically focus the device and pattern.

Another feature of the system and method is the use and operation with speech control, response and reporting. Data, which is expressed in speech, such as temperature, are reported via a voice chip in a selected language; and the system is activated and responds to voice commands to inspect or report data. An operator selects from a menu of different languages and both vocal and visual reports are then generated.

The visible sighting pattern display not only outlines the target area, but also indicates and/or displays parameters such as time, distance and temperature, on or at the target image. These values are likewise distributed with the temperature image to the annexed interfaced device (e.g., cell phone). Thus both the sighting pattern image of reflected projected visible light and the image of the infrared emitting area are each detected and are both conveyed from the identification apparatus and interfaced to a cell phone or the like for further management. Values of the above parameters are displayed, preferably within an identification frame of a box or circle. The visible light pattern is arranged to pulsate to attract attention and to conserve the power (battery) source.

The management of the detected image on an iPhone, for example, includes the option of zooming or compressing the image to feature hot spots or any particular digital area of the image. The image and data is conveniently sent on by email and temperature of any point of the image is identified individually and discreetly. Results of detection are also broadcast aloud, such as identification of hot or cold spots.

EXAMPLE

In a preferred best mode example of the invention a thermal detection and display system comprises the combination of (a) detector means responsive to visible and/or infrared radiation on a remote surface which includes a visible light identification display pattern projected onto said surface to identify/locate the location and origin of infrared radiation with detector means for visible light and (b) means to transfer a compound image of both infrared features detected and visible marking detected to a display means for image management comprising an iPhone, cell phone or PDA.

The invention includes a measuring device for measuring the temperature of a measured spot on a measured object without contacting the measured object, wherein said device comprises (a) a detector; (b) an optical imaging system for illuminating said detector with infrared radiation from said measured spot; and (c) sighting means for marking the position and/or size the measured spot on the measured object, said sighting means comprising the combination of separate visible light sources that each provides a respective sighting system. The measuring device is switchable between short range focusing and long focusing.

The invention measuring device further includes sighting means for a radiometer for visibly marking a measuring surface, a temperature of which is measured by said radiometer, comprising preferably at least three separate visible light sources, each of which emits a visible light beam, said light sources are arranged such that said visible light beams generate a plurality of points at an edge of said measuring surface; and a control circuit is provided for switching said light sources on and off; and said control circuit is adapted such that at most two light sources are on simultaneously.

The invention is further directed to a radiometer comprising an infrared detector, at lens arranged with respect to said detector to focus infrared radiation from a measuring surface to said detector; and a light source emitting visible light for marking said measuring surface; said marking providing visible indication based upon a reading of said infrared detector.

A method of the invention comprises imaging a remote thermal measurement surface comprising (a) visualizing an area of infrared emission on said remote surface by illumination of said surface with a projected aiming pattern of visible light, reflected therefrom together with the infrared emission, and (b) displaying an image of both the infrared and visible surface features, separately detected, as a combined image signal; which is (c) conveyed to a management device. In exercise of the method voice commands activate the system and results are reported visually/vocally.

The invention also includes a method for a radiometer of visibly marking a measuring surface, the method comprising: emitting visible light beams by at least three light sources for visible marking said measuring surface, each light source emitting one light beam; and switching said light source on and off, at least two light sources being switched on simultaneously.

DRAWING

In the drawing, Figure One is a functional block diagram of an infrared thermal imaging camera/night vision camera with single laser emitter and both speech generation and response capacity at a voice chip interfaced with an iPhone/PDA for display and transmission.

Figure Two is a functional block diagram of the device similar to that illustrated with Figure One, but with separate or multiple laser display emitters, which generate a plurality of points at an edge of the measuring surface. The key pad, processor and laser driving circuit provide control switching meant for switching lasers on and off, so that in a preferred embodiment at most two light sources are on simultaneously.

The invention claimed is:

1. A measuring device for measuring the temperature of a measured spot on a measured object without contacting the measured object, wherein said device comprises: (a) a detector; (b) an optical imaging system illuminating said detector with infrared radiation from said measured spot; (c) sighting means for marking the position and/or size of the measured spot on the measured object; and (d) means to transfer both an image of detected infrared radiation together with an image of visible marking of the measured spot to a display means for image management.

2. A measuring device according to claim 1 which includes sighting means for a radiometer for visibly marking a measuring surface, a temperature of which is measured by said radiometer, comprising at least three light sources, each of which emits a visible light beam, said light sources being arranged such that said visible light beams generate a plurality of points at an edge of said measuring surface; and a control circuit for switching said light sources on and off, said control circuit adapted such that at most two light sources are on simultaneously.

* * * * *